April 5, 1955    R. W. CHAWNER    2,705,419
APPARATUS FOR HYDROSTATICALLY FILLING CYLINDERS
Filed April 11, 1952
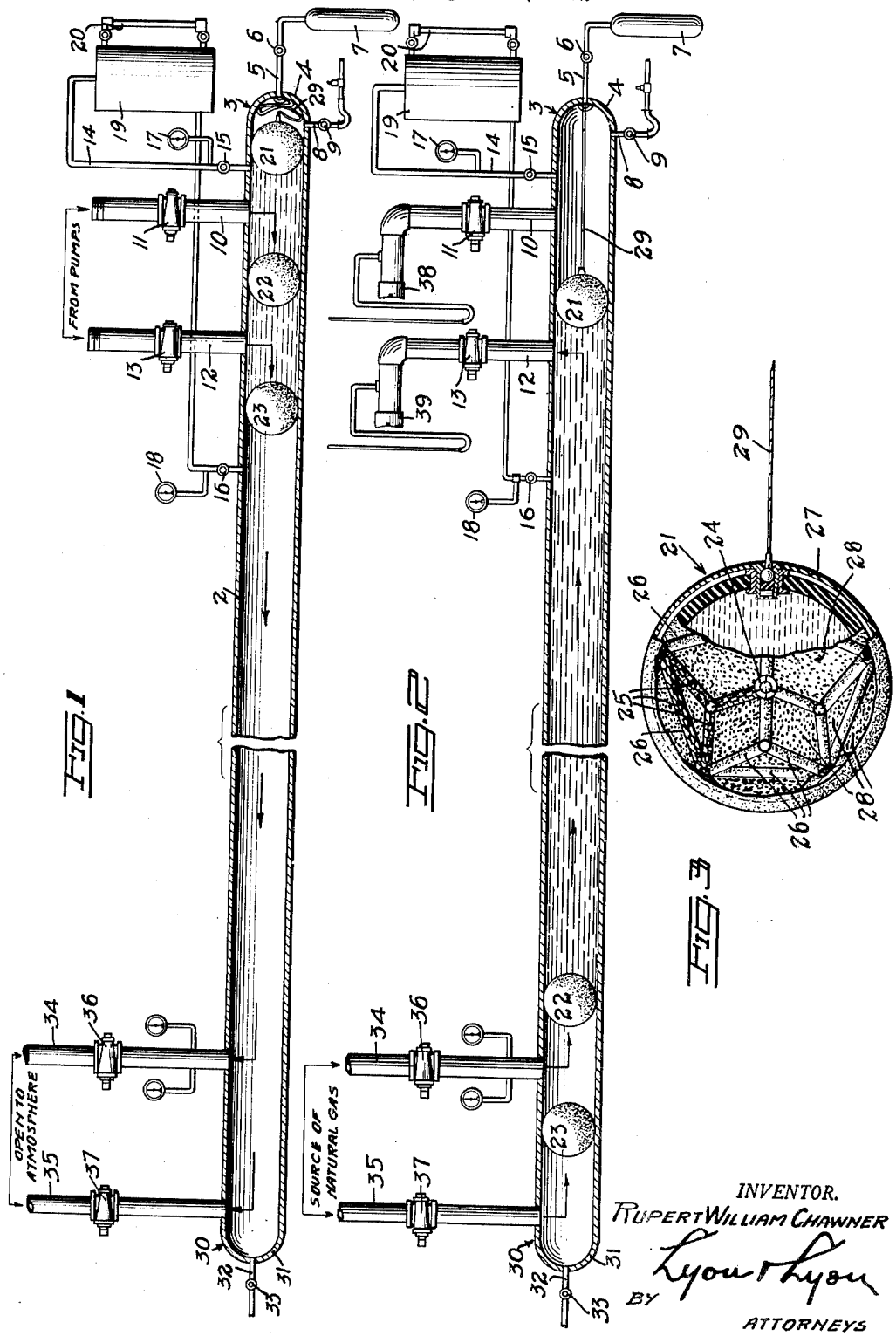
INVENTOR.
RUPERT WILLIAM CHAWNER
BY Lyon & Lyon
ATTORNEYS

United States Patent Office 2,705,419
Patented Apr. 5, 1955

2,705,419

APPARATUS FOR HYDROSTATICALLY FILLING CYLINDERS

Rupert William Chawner, Corona, Calif.

Application April 11, 1952, Serial No. 281,924

5 Claims. (Cl. 73—40.5)

This invention relates to apparatus for hydrostatically testing and filling cylinders and is of particular value as applied to the testing and filling of pipe lines, such as gas, oil, water, sewage and chemical lines.

While the apparatus of the present invention in its broader aspect has application for a great variety of uses, it has special advantages as applied to the testing and filling of natural gas pipe lines. Pipe lines for natural gas are required to be hydrostatically tested. There is also a problem presented in construction and testing of said lines of filling the lines with natural gas. The filling of lines with natural gas must be so conducted as to avoid any admixture of air with the natural gas as otherwise an explosive mixture will be created.

By means of the present invention apparatus is provided in which a section of line to be tested, such for example as a 10,000 ft. section of line, is first taken and all of the air in the line displaced by the introduction of water. In this operation test-heads are placed at the opposite ends of the section to be tested and after the operation of filling the same with water the desired hydrostatic pressure is applied to test the line. Following the hydrostatic test of the line the water from the line is then replaced with natural gas.

Any long section of pipe line is almost certain to pass over various elevations and a problem has heretofore existed in insuring adequate removal first of air from the line and a complete filling of the line with water and then a complete removal of the water from the line and filling of the line with natural gas without permitting the introduction of air. In accordance with the apparatus of this invention these problems are overcome by apparatus which utilizes a number of balls, one or more of which are caused to travel through the pipe line in front of the fluid being introduced so as to have the effect of reducing the mixing of that fluid with the fluid already in the line and to insure the removal of the fluid already in the line by the entering fluid. Since in the construction of the line there may be a variety of obstructions which the balls encounter in order that a proper seal shall be made by a ball capable of being driven through the line, the ball has to be so constructed that it is non-rigid and yet under pressure conditions existing in the testing and filling operation it will retain sufficient of its shape to act as a seal and a barrier between the two fluids and not be flattened out so as to bypass the following fluid.

I have found that ball devices of the type covered by my Patent No. 2,258,174 issued October 7, 1941 with preferably some additions will satisfactorily perform in the contemplated testing and filling method and apparatus. As illustrated in the aforesaid patent there is provided a hollow rubber ball, the covering of which may be fabric reinforced and the term "rubber" is utilized as including anything of similar properties, such as plastic materials, synthetic rubber, etc. In my prior patent these balls are pneumatically inflated but in the apparatus of the present invention they are filled using fluid such as water. Around the exterior of the wall is provided a chain covering and the presence of such a chain wrapping is an important factor in the apparatus of the present invention as without such a chain covering tests have proven that the balls will not maintain sufficient spherical shape to act as a barrier between preceding and following fluids. Also in practice covering material is provided for the chains, or portions thereof at least, such as rubber or plastic hose in order that there will be a better sealing contact between the walls of the pipe line and the ball.

The use of the apparatus of the present invention includes the preliminary step of driving one or more of said ball devices through the pipe line to be hydrostatically tested so as to drive in front of the ball the air originally present in the pipe line, the ball being driven by water introduced at a controlled rate at the rear of the ball device. The apparatus of the present invention also necessarily includes means whereby the ball may be caused to travel at a proper rate through the conduit to be tested and filled. I have found that if these balls are driven through the pipe line at too slow a velocity they will not sufficiently evacuate the air from the line, in fact the ball may stop movement and allow itself to be bypassed by the water introduced. Too high a rate of introduction of water back of the ball device will create a turbulence which, notwithstanding the presence and use of the ball device will result in considerable air being left in the pipe line.

In the apparatus of the present invention means must also be provided to stop the ball device at the end of its intended travel. This presents a substantial problem as unless proper precautions are taken the ball may travel through the pipe to be tested at terrific velocities sufficient to damage the pipeline particularly when they arrive at the end of the pipeline undergoing test. In testing and filling operations performed with previous apparatus there have been instances where the line itself, where there is a sharp bend in the line itself or at the end of the line, has been ruptured in testing or cleaning operations.

In the apparatus of the present invention a novel type of buffer or braking means is provided in order to eliminate the hazard of the ball devices arriving at high velocity at the end of the pipe section undergoing tests.

In order to make the desired hydrostatic test it is essential that there be no substantial quantity of air left in the line. It should be here recognized that pipe lines for the conducting of high pressure natural gas (the operating pressure now being 700 p. s. i. and will undoubtedly go higher as the technique of steel fabrication improves) are quite different from the high pressure water lines where the pressures are considerably less.

While the apparatus of the present invention is of special value in connection with the testing and filling of natural gas lines, the same apparatus including the same ball devices are of great utility in operation of oil lines where two different types of oil are to be transported through the lines separately from each other.

The apparatus of the present invention, together with further novel features and advantages of the invention will be more fully understood from the following description of an example of the invention as applied in testing and filling of a section of natural gas pipe lines. I have, therefore, hereafter described such a preferred example of the invention in connection with the accompanying drawings, in which:

Figure 1 is an elevation of the apparatus with most of the pipe line to be tested cut away illustrating the position of the apparatus just before the start of the test procedure;

Figure 2 is a similar view illustrating the position of the apparatus just before the return of the ball devices or the introduction of natural gas; and Figure 3 is a fragmentary perspective section of one of the covered ball devices used as a buffer.

Referring first to Figure 1 of the drawings, preferably at the lower end of the two ends of a section of pipe line 2 to be tested, there is provided what is referred to as a test-head 3, the body of which constitutes a portion of pipe line identical with that of the pipe line 2 and welded thereto. At the end of the header there is a closure as indicated at 4. From the closure there is a small line 5 which leads to a valve 6 to a container 7 which may hold carbon dioxide, nitrogen or other inert gas. Near the closure 4 from the lower side there is a small drain line 8 which leads through the valve 9. At a distance of, for example, about 7 ft. from the closure 4 there is provided a larger line 10 which leads through a valve 11, and at the start of the apparatus the line 10 is connected to the outlet of a high capacity water pump (not shown). At a further spacing from the closure 4 there is a similar line 12 having a valve 13 which likewise at the start of the testing procedure is connected to the outlet of high capacity water pump (not shown). From near the closure 4 a small gauge line 14 leads to a point on the header beyond the line 12. This gauge line includes the valves 15, 16, gauges 17, 18, water column 19 and sight tube 20.

Within the header 3 I have shown to be present three ball devices 21, 22 and 23 although in certain cases only two thereof may be utilized. Each of the ball devices 21, 22 and 23 are hollow balls formed with fabric reinforced rubber or elastic material, such as natural rubber, synthetic rubber, plastic material, etc. Each of the ball devices is in the use of the present invention of a diameter substantially equal to that of the pipe line 2 to be tested. Each ball device 21, 22 and 23 also is provided with a chain, the chains being constructed as described in my Patent No. 2,258,174 utilizing a plurality of rings 24 with connecting sections of chain 25. In the case of the two ball devices 22 and 23, in order to form a better sealing contact with the walls of the pipe 2 the chain sections 25 between the rings 24 are covered with a suitable covering material, such as sections of rubber or plastic hose 26. In the case of ball device 21 there is an additional covering 27 of fabric reinforced rubber-like material covering or enclosing the chains. In the space between the inner face of said outer covering and the outer face of the ball there is provided a rubber-like material, such as sponge rubber 28 so as to eliminate deformation of this ball when subject to the heavy hydrostatic pressure during testing. The ball device 21 is attached by a cable 29 the other end of which is fastened to the closed end 4 of the header 3. This cable should be about 7 ft. in length for the purposes hereafter described.

As will be seen from Figure 1 of the drawings, at the start of the operation the ball device 21 is between the closed end 4 and the pipe 10 of the header 3, the ball device 22 being located between the pipe lines 10 and 12 and the header for the ball device 23 is located just beyond the pipe line 12.

At the other end of the section of pipe line to be tested there is a header 30 provided which is closed at its end as indicated at 31 and provided with the small line 32 with valve 33 and with the two spaced apart larger lines 34 and 35, each provided with valves 36 and 37. These three lines in practice are to be connected to a source of natural gas under high pressure but at this stage are open to the atmosphere. In the operation of the present invention after the apparatus has been assembled as illustrated and described in connection with Figure 1 of the drawings, water is introduced through line 12 at a controlled rate so as to cause the ball device 23 to travel through the pipe line 2 to be tested forcing in front thereof the air. The water should be introduced into the system at such a rate as to cause this ball device 23 to travel at a velocity of about 3 to 4 ft. per second. After a short interval of time, such for example as 20 minutes, the water is introduced through the line 10 back of the second ball device 22 (valve 13 being closed). This starts the ball device 22 down the pipe line following at a suitable interval the ball device 23.

While I have described in the preferred process the use of two balls, one following the other, these may not in all cases be necessary. The first ball device substantially evacuates the pipe as it travels along so that the pipe becomes filled with water, but in case any air does bypass that ball such air will be evacuated by the second ball device 22.

It is to be understood, of course, that before the start of this operation any valve along the section of the pipe line undergoing tests may be opened to facilitate the evacuation of air and one or more of the lines at the header 30 should be opened to allow for the escape of air. It is also good practice in the test procedure to install nipples and valves on any high spots in the section of pipe undergoing test to better insure evacuation in such high spots. Likewise similar valves and nipples should be installed at the low points or "sags" of the line for evacuation of water when needed. The operator should leave all such valves in the line open as the water is introduced until it is observed that the water has reached the valve passing therefrom, at which time they are successively closed down the pipe line. The valve should not be closed until it is observed that only solid water is ejected.

In the process of introducing water into a pipe section to be tested the water introduced should be carefully metered in order that the operator will know from the metering of the water approximately when the ball devices 22 and 23 are going to arrive at the header 30. At such time the velocity at which water is pumped into the device is very materially reduced in order to prevent damage to the ball devices by their contact with the end of the header. There is not too great danger of damage to the ball devices in this direction of their travel since at the header 30 there is a pneumatic cushion of air which will brake the ball device provided the valves of the header 30 are only cracked open to allow a slow escape of air.

If desired means may be provided for detecting the movement of the balls through the pipe line, one of such means being the addition at approximately the center of each of the traveling ball devices 22 and 23 of a so-called radioactive pill which may then signal the position of the ball to a Geiger counter type of device known as a scintillometer.

When the pipe section to be tested and the headers have become completely filled with water the desired tests may now be performed, which is carried out by applying a hydrostatic head or pressure to the water within the apparatus and then allowing the apparatus to stand for a period of time to observe to what extent, if at all, there is a loss of water pressure. The test procedures will vary in accordance with the conditions in different regions but, for example, a pressure of 1400 lbs. per sq. in. may be developed within the pipe line which is then allowed to stand for 24 hours and a measurement taken of the drop in pressure. If the pipe section satisfactorily passes the test then the operator is ready to remove the water and fill the tested section with natural gas. The apparatus is then changed as indicated in Figure 2 of the drawings.

The lines 32, 34 and 35 which have been previously vented to the atmosphere are now connected to a source of natural gas under high pressure. At the header 3 the lines 10 and 12 which had been previously connected to the outlet of high capacity water pump are now provided with orifice gauges 38 and 39. At this time valve 6 is manipulated so as to insure the introduction of sufficient inert gas, such as carbon dioxide or nitrogen, back of the ball 21 to force that ball to the end of its cable 29. During the motion of the ball 21 at the end of its cable water is forced out lines 10 and 12 through orifices 38 and 39 until the ball passes line 10, whereupon the exit is only through line 12, whereupon valves 33, 36 and 37 are opened to admit natural gas back of the ball devices 22 and 23 in order to cause such ball devices to return through the pipe line.

Again the operator should introduce the natural gas at such a rate as to cause the ball devices to travel through the pipe line at a speed around 3 to 4 ft. per second, the ball devices pushing in front of them the water, the removal of which from the pipe line, to some extent is facilitated by the fact that the pipe section to be tested as a whole is downhill from the direction of introduction of natural gas. In this operation valves along the pipe line are open to facilitate the discharge of water, including particularly any valves at the low points of the line, and these remain open until it is observed that nothing but pure gas escapes therefrom, whereupon they are closed.

The rate of movement of the balls under the influence of pressure of the entering gas is not under as complete control as the rate of movement of the balls when they are under pressure of water, natural gas being an expansible material and there is considerable danger of the balls hanging up and then greatly accelerating in velocity. It is to be understood, of course, that during the introduction of natural gas valves 11 and 13 are open so water is being discharged from the orifices at rates determined by the orifice meter. Also throughout this operation the operator is regulating the introduction of inert gas through line 5 to insure the ball device 21 is in an extended position. A certain amount of the inert gas escapes beyond the ball device 21 and may require the operator to change the container 7. During the change of the container water will enter the line 14 and be visible in the sight tube 20 if there is too much delay in changing the container allowing a drop in pressure between the ball device 21 and the closed end 4. The operator on changing containers adds sufficient inert gas to drive all of the liquid out of the line 14.

When the ball devices 22 and 23 have again returned to the header 3 they are prevented from damaging either the apparatus or bursting themselves since the ball device 21 acts as a buffer or braking device, being maintained in position only by a pneumatic cushion of inert gas. By this method it is found possible to substantially completely remove all water from the pipe line tested and to fill that line with natural gas without allowing any air to be admitted. Thereafter the usual technique of separating the tested and filled section of pipe line may be followed, the pipe line being capped until connected into the system.

While the particular example of the apparatus of the present invention herein described is well adapted to carry out the objects of the invention this invention is of the scope set forth in the appended claims.

I claim:

1. An apparatus for hydrostatically testing a pipe line which comprises, headers formed at the ends of said pipe line, fluid inlets to said headers at spaced-apart positions, and a chain covered ball having a diameter substantially equal to that of the pipe being tested in one of said headers to provide a moving barrier between a fluid introduced at one side of the ball and the fluid at the other side.

2. An apparatus for hydrostatically testing a pipe line which comprises, headers formed at the ends of said pipe line, fluid inlets to said headers at spaced-apart positions, and a chain covered ball having a diameter substantially equal to that of the pipe being tested in one of said headers to provide a moving barrier between the fluid introduced at one side of the ball and the fluid at the other side, one of said headers including an additional chain covered ball flexibly tied to the end of said header, and means for introducing an inert gas between said latter ball and header.

3. An apparatus for hydrostatically testing a pipe line which comprises, headers formed at the ends of said pipe line, fluid inlets to one of said headers at spaced-apart positions, and a chain covered ball having a diameter substantially equal to that of the pipe being tested in said latter header to provide a moving barrier between a fluid introduced at one side of the ball and the fluid at the other side, fluid outlets at the other header at spaced-apart positions and orifice gauges connected with said fluid outlets.

4. An apparatus for hydrostatically testing a pipe line which comprises, headers at the ends of said pipe line, a chain covered ball having a diameter substantially equal to that of the pipe being tested within said pipe line movable therethrough to serve as a sealer between different fluids passing through said line, lines at said headers for introduction or removal of fluids, and an orifice gauge connected to one of said lines for measuring the fluid being discharged.

5. An apparatus for hydrostatically testing a pipe line which comprises, headers at the ends of said pipe line, a chain covered ball having a diameter substantially equal to that of the pipe being tested within said pipe line movable therethrough to serve as a sealer between different fluids passing through said line, lines at said headers for introduction or removal of fluids, an orifice gauge connected to one of said lines for measuring the flued being discharged, the header at which an orifice gauge is positioned having an added chain covered ball flexibly tied to the end of said header, and means for maintaining a pressure of inert gas between the said ball and the end of the header.

References Cited in the file of this patent

UNITED STATES PATENTS

| | | |
|---|---|---|
| 646,545 | Novotny | Apr. 3, 1900 |
| 1,088,459 | Shade | Feb. 24, 1914 |
| 2,258,174 | Chawner | Oct. 7, 1941 |
| 2,399,544 | Danner | Apr. 30, 1946 |
| 2,545,102 | Miller | Mar. 13, 1951 |